(12) United States Patent
Nishibori et al.

(10) Patent No.: US 9,001,540 B2
(45) Date of Patent: Apr. 7, 2015

(54) POWER SOURCE APPARATUS

(71) Applicant: Minebea Co., Ltd., Kitasaku-gun, Nagano (JP)

(72) Inventors: Kohei Nishibori, Iwata (JP); Nadthawut Chalermboon, Fukuroi (JP)

(73) Assignee: Minebea Co., Ltd., Kitasaku-Gun (JP)

( * ) Notice: Subject to any disclaimer, the term of this patent is extended or adjusted under 35 U.S.C. 154(b) by 51 days.

(21) Appl. No.: 14/044,373

(22) Filed: Oct. 2, 2013

(65) Prior Publication Data

US 2014/0098583 A1 Apr. 10, 2014

(30) Foreign Application Priority Data

Oct. 9, 2012 (JP) ................................. 2012-224293

(51) Int. Cl.
| | |
|---|---|
| *H02M 5/42* | (2006.01) |
| *H02M 7/04* | (2006.01) |
| *H02M 7/68* | (2006.01) |
| *G05F 5/00* | (2006.01) |
| *H02M 1/42* | (2007.01) |

(52) U.S. Cl.
CPC ............ *H02M 1/4208* (2013.01); *Y02B 70/126* (2013.01); *H02M 1/4225* (2013.01)

(58) Field of Classification Search
USPC ........................................ 363/84, 89; 323/207
See application file for complete search history.

(56) References Cited

U.S. PATENT DOCUMENTS

| | | | |
|---|---|---|---|
| 2007/0058402 A1* | 3/2007 | Shekhawat et al. | 363/89 |
| 2009/0256543 A1* | 10/2009 | Yang | 323/284 |
| 2011/0075462 A1* | 3/2011 | Wildash | 363/127 |

FOREIGN PATENT DOCUMENTS

JP        A-2011-152017        8/2011

* cited by examiner

*Primary Examiner* — Emily P Pham
(74) *Attorney, Agent, or Firm* — Oliff PLC

(57) ABSTRACT

A power source apparatus includes: a first series circuit that has a first rectifier element, a first switching element, and a third rectifier element; a second series circuit that has a second rectifier element, a second switching element, and a fourth rectifier element; a reactor connected between a connecting point of the first rectifier element and the first switching element and a connecting point of the second rectifier element and the second switching element; and a current detection unit having a first resistor element. The first and second switching elements are controllable based on a first zero current detection signal in accordance with a first current detected in the current detection unit, and a desired direct current voltage is fed to a load circuit.

8 Claims, 7 Drawing Sheets

F I G. 1
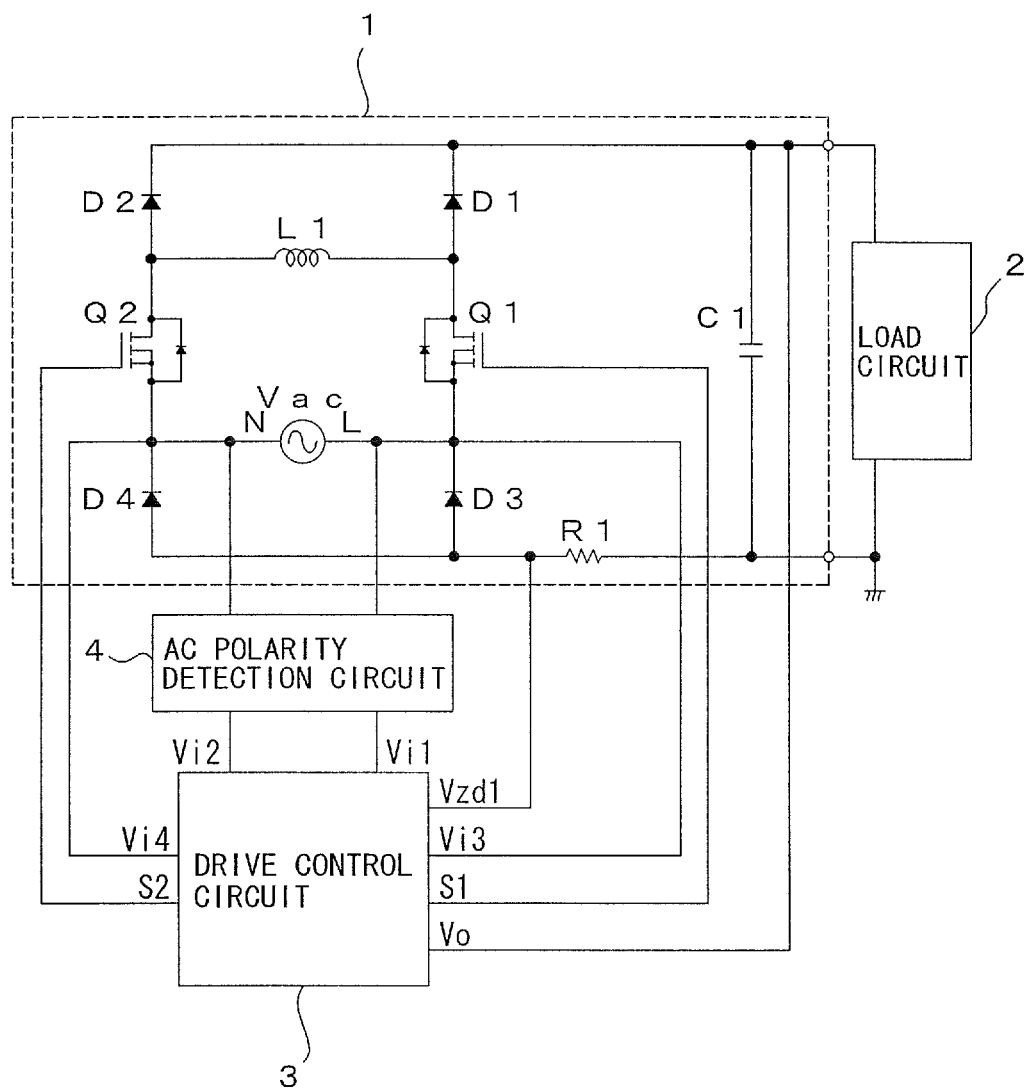

FIG. 5A Vac
FIG. 5B IL1
FIG. 5C Vi1
FIG. 5D Vi2
FIG. 5E Vzd3
FIG. 5F Vzd2

F I G. 7
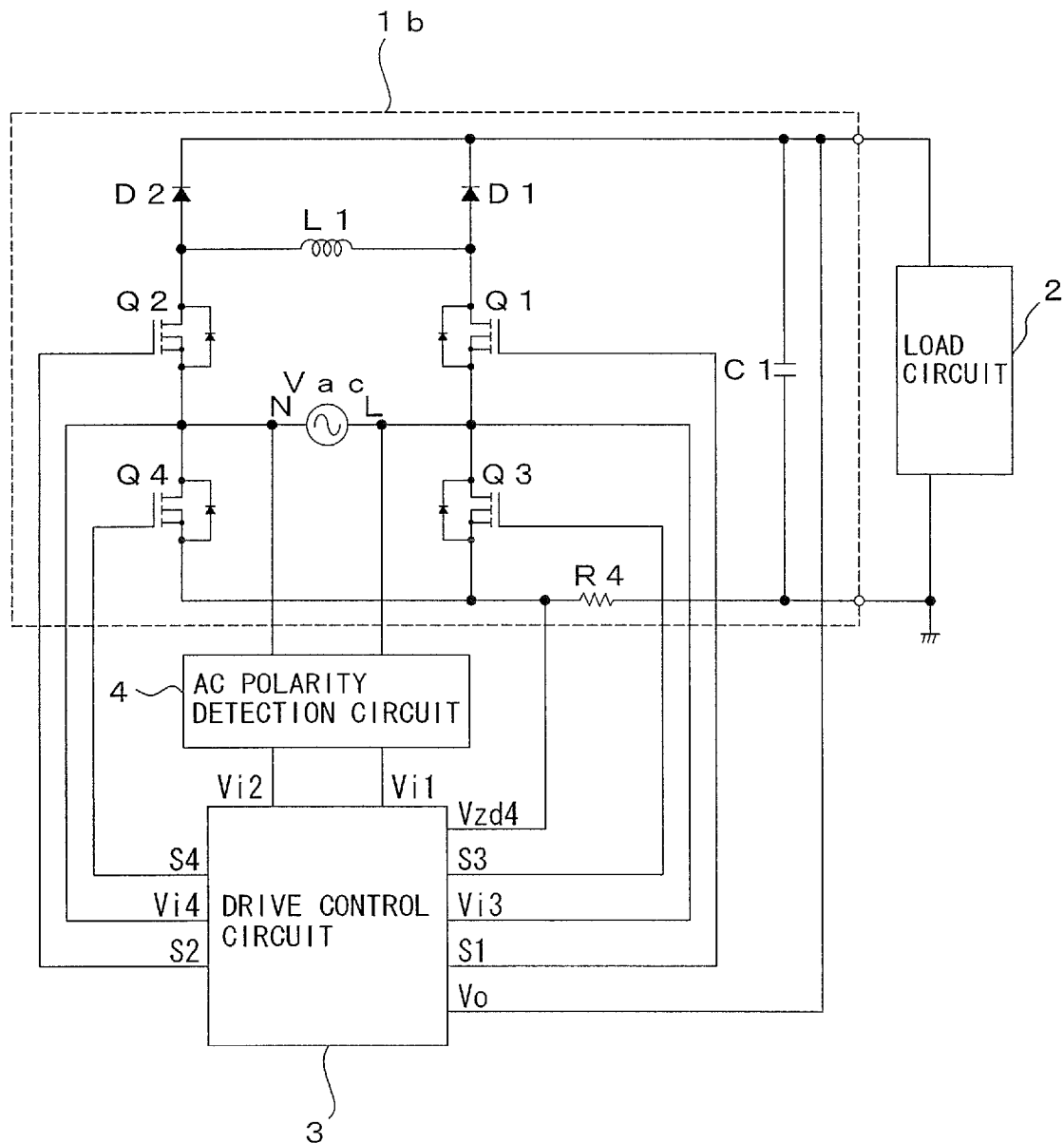

POWER SOURCE APPARATUS

BACKGROUND OF THE INVENTION

1. Field of the Invention

The present invention relates to a power source apparatus having a power factor correction circuit function, and particularly to operation in a critical mode of a bridgeless power factor correction circuit of a power source apparatus.

2. Description of the Related Art

Conventionally, in order to supply electric power to a load, a power source apparatus in which an AC (alternating current) voltage from an input AC power source is rectified and then converted to a desired AC or DC (direct current) voltage and supplied to the load has been widely used. In this kind of power source apparatus, a power factor correction circuit needs to be provided in order to correct the power factor and reduce the EMT noise generated by the power source apparatus. Therefore, in a general constitution of a power source apparatus, a rectification circuit consisting of a diode bridge and a power factor correction circuit consisting of a boost converter circuit are installed in the input stage.

In recent years, in a power source apparatus, a so-called bridgeless power factor correction circuit, in which a front stage diode bridge is made unnecessary by combining a power factor correction function by a boost operation and a rectification function, has been proposed (for example, refer to Japanese Patent Application Laid-Open (JP-A) No. 2011-152017). In this power factor correction circuit, the input stage of the power source apparatus can be constituted by a simple circuit and the conduction loss of the diode can be reduced, and thus this kind of power factor correction circuit is advantageous over a constitution in which the rectification circuit and the power factor correction circuit are provided separately.

SUMMARY OF THE INVENTION

In general, a critical mode is used as an operation mode of a power factor correction circuit. In a critical mode, a point in time at which the reactor current becomes zero is detected during the period in which the main switching element is turned OFF, and the ON/OFF of the main switching element is controlled such that the main switching element is switched ON immediately after the above-mentioned point in time is detected. Therefore, in order to operate the power factor correction circuit in a critical mode, it is necessary to detect the point in time at which the reactor current becomes zero. As such a current detection technology, a current transformer or a current detection resistor has generally been used, as in the power factor correction circuit disclosed in JP-A No. 2011-152017.

However, for example, in a current detection technology using a current transformer, there has been a problem in that an additional circuit such as a reset circuit is necessary in order to achieve the necessary detection accuracy, and thus the circuit constitution and the control thereof becomes complicated. In contrast, in the case that a current detection resistor is connected to the reactor current path, it is possible to constitute the current detection circuit with an inexpensive and simple circuit.

However, in the power factor correction circuit disclosed in JP-A No. 2011-152017, there has been a problem in that a side of the output terminal of the AC power source which is connected to the reactor enters a floating state relative to the ground of the power factor correction circuit, and this leads to an increase in the EMI noise.

The present invention has been made in view of the above-described problems, and an object of the present invention is to provide a power source apparatus including a power factor correction circuit that is highly efficient and capable of reducing EMI noise, in which the point in time at which the reactor current becomes zero can be detected with an inexpensive and simple circuit constitution.

The below-described embodiments exemplify constitutions of the present invention, and will be explained in an itemized manner in order to facilitate the understanding of the various constitutions of the present invention. Each item is not meant to limit the technical scope of the present invention, and substitutions or deletions of a portion of the constituent elements of each item as well as additions of other constituent elements upon referring to the detailed description of the preferred embodiments are included within the technical scope of the invention.

According to a first aspect of the present invention, there is provided a power source apparatus including: a power factor correction circuit including: a first series circuit that consists of a first rectifier element (D1), a first switching element (Q1), and a third rectifier element (D3, Q3), a second series circuit that consists of a second rectifier element (D2), a second switching element (Q2), and a fourth rectifier element (D4, Q4), and is connected in parallel to the first series circuit, a smoothing capacitor (C1) that is connected in parallel to the first and second series circuits and a load circuit, and a reactor (L1), one end of which is connected to a connecting point between the first rectifier element (D1) and the first switching element (Q1) and the other end of which is connected to a connecting point between the second rectifier element (D2) and the second switching element (Q2); and a control circuit unit that inputs an alternating current (AC) voltage of an AC power source (Vac) and an output voltage output to the load circuit, and controls a switching operation of at least the first and second switching elements (Q1, Q2); wherein one end of the AC power source (Vac) is connected to a connecting point between the first switching element (Q1) and the third rectifier element (D3, Q3) and the other end of the AC power source (Vac) is connected to a connecting point between the second switching element (Q2) and the fourth rectifier element (D4, Q4); wherein the power source apparatus further includes: an AC polarity detection unit that detects a positive/negative polarity of the AC power source (Vac); and a current detection unit that detects a first current flowing between a connecting point of the third rectifier element (D3, Q3) and the fourth rectifier element (D4, Q4) and a ground, or detects a second current flowing to the third rectifier element (D3, Q3) and a third current flowing to the fourth rectifier element (D4, Q4); wherein the control circuit unit controls the first and second switching elements (Q1, Q2) based on a first zero current detection signal output from the current detection unit in accordance with the first current or based on second and third zero current detection signals output from the current detection unit in accordance with the second and third currents, and feeds a desired direct current (DC) voltage to the load circuit.

In the first aspect, a positive half cycle and a negative half cycle of the AC power source (Vac) are determined based on an AC polarity detection signal output from the AC polarity detection unit.

In the first aspect, the current detection unit includes a first resistor element (R1, R4) that is disposed between a connecting point of the third rectifier element (D3, Q3) and the fourth rectifier element (D4, Q4) and a ground and, detects the first current.

In the first aspect, the current detection unit includes a second resistor element (R2) that is disposed between one end of the third rectifier element (D3, Q3) that is on the opposite side of an end connected to the first switching element (Q1) and a ground and detects the second current, and a third resistor element (R3) that is disposed between one end of the fourth rectifier element (D4, Q4) that is on the opposite side of an end connected to the second switching element (Q2) and a ground and detects the third current.

In the first aspect, the control circuit unit alternately detects the second zero current detection signal and the third zero current detection signal output from the current detection unit in accordance with the positive half cycle and the negative half cycle of the AC power source (Vac).

The power factor correction circuit according to the present invention is constituted as described above, and thus a power source apparatus including a power factor correction circuit that is highly efficient and capable of reducing EMI noise, in which the point in time at which the reactor current becomes zero can be detected with an inexpensive and simple circuit constitution, can be provided.

BRIEF DESCRIPTION OF THE DRAWINGS

FIG. 1 is a circuit constitution diagram illustrating a power source apparatus according to a first embodiment of the present invention;

FIG. 7 is a circuit constitution diagram illustrating a power source apparatus according to a third embodiment of the present invention.

DETAILED DESCRIPTION OF THE PREFERRED EMBODIMENTS

Figure 2:
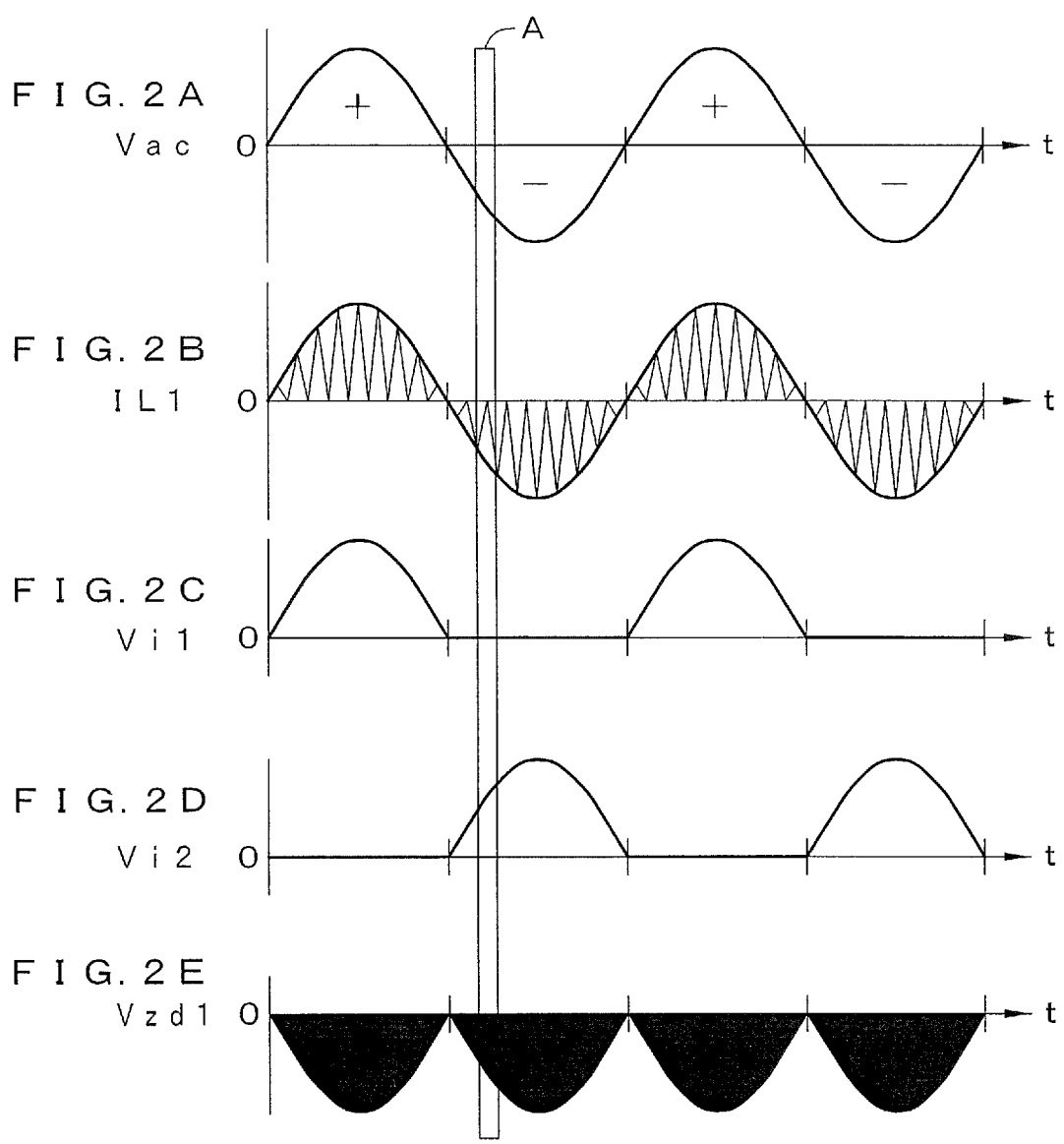
FIG. 2A to FIG. 2E are waveform diagrams each illustrating the operation of the essential parts of the power source apparatus shown in FIG. 1.

Hereinafter, embodiments of the present invention will be explained with reference to the attached drawings.

FIG. 1 is a circuit constitution diagram illustrating a power source apparatus 10 according to a first embodiment of the present invention.

The power source apparatus 10 has a power factor correction circuit 1. The power factor correction circuit 1 functions to rectify, boost, and correct the AC voltage of an AC power source Vac. The voltage that has been subjected to the rectification, the boost, and the correction then applies to a load circuit 2. The load circuit 2 is typically constituted by a DC-DC converter circuit or a DC-AC converter circuit, and the power factor correction circuit 1 constitutes an input stage of the power source apparatus 10 that on the whole forms an AC-DC converter or an AC-AC converter. However, the present invention is not limited by the specific constitution of the load circuit 2, and any appropriate circuit may be applied.

The power factor correction circuit 1 includes a first series circuit (indicated by reference numeral "D1-Q1-D3" when necessary) consisting of a first rectifier element D1, a first switching element Q1, and a third rectifier element D3, and a second series circuit (indicated by reference numeral "D2-Q2-D4" when necessary) consisting of a second rectifier element D2, a second switching element Q2, and a fourth rectifier element D4.

In the power factor correction circuit 1, diodes are used as the first to fourth rectifier elements D1 to D4, and MOS-FETs are used as the first and second switching elements Q1 and Q2. In the first series circuit, the anode terminal of the first rectifier element D1 is connected to the drain terminal of the first switching element Q1, and the source terminal of the first switching element Q1 is connected to the cathode terminal of the third rectifier element D3. In the second series circuit, the anode terminal of the second rectifier element D2 is connected to the drain terminal of the second switching element Q2, and the source terminal of the second switching element Q2 is connected to the cathode terminal of the fourth rectifier element D4.

In the first series circuit and the second series circuit, the cathode terminals of the first and second rectifier elements D1 and D2 are connected to each other, and the anode terminals of the third and fourth rectifier elements D3 and D4 are connected to each other, and these connections are in parallel. Further, one end of a smoothing capacitor C1 is connected to the connecting point of the cathode terminals of the first and second rectifier elements D1 and D2, and the other end of the smoothing capacitor C1 is connected via a first resistor element R1 to the connecting point of the anode terminals of the third and fourth rectifier elements D3 and D4. In this way, the smoothing capacitor C1 is connected in parallel to the first series circuit and the second series circuit. Also, the load circuit 2 is connected in parallel to the smoothing capacitor C1.

The power factor correction circuit 1 includes a reactor L1. One end of the reactor L1 is connected to the connecting point of the first rectifier element D1 and the first switching element Q1, and the other end of the reactor L1 is connected to the connecting point of the second rectifier element D2 and the second switching element Q2. In the power source apparatus 10, one end L (hereinafter also referred to as "L-side terminal") of the AC power source Vac is connected to the connecting point of the first switching element Q1 and the third rectifier element D3, and the other end N (hereinafter also referred to as "N-side terminal") of the AC power source Vac is connected to the connecting point of the second switching element Q2 and the fourth rectifier element D4.

In the power source apparatus 10, the first resistor element R1 is connected between the connecting point of the anode terminals of the third and fourth rectifier elements D3 and D4 and one end of the smoothing capacitor C1 that is on the opposite side of the end that is connected to the connecting point of the cathode terminals of the first and second rectifier elements D1 and D2. The end of the smoothing capacitor C1 that is connected to the first resistor element R1 constitutes a ground of an output voltage of the power factor correction circuit 1 (hereinafter simply referred to as "ground"). In other words, the first resistor element R1 is disposed between the connecting point of the third rectifier element D3 and the fourth rectifier element D4 and the ground. In the power source apparatus 10, the first resistor element R1 constitutes a current detection unit that detects a first current to be explained below (hereinafter, the current detection unit will also be referred to with the same reference numeral R1).

The power source apparatus 10 further includes a drive control circuit (one example of a control circuit unit) 3 that controls the switching operation (ON/OFF operation) of the first and second switching elements Q1 and Q2. An output voltage Vo output from the power factor correction circuit 1 to the load circuit 2 is input into the drive control circuit 3, and the switching operation of the first and second switching elements Q1 and Q2 is controlled in accordance with the output voltage Vo. Thereby, a desired output voltage of the power factor correction circuit 1 is achieved. Further, an AC voltage of the AC power source Vac is input into the drive control circuit 3 as an L-side terminal voltage Vi3 and an N-side terminal voltage Vi4. Further, a first zero current detection signal Vzd1 to be explained below is input from the current detection unit R1 into the drive control circuit 3. Thereby, the drive control circuit 3 generates appropriate drive signals (in this case, gate drive voltages S1 and S2) for the first and second switching elements Q1 and Q2.

Here, in the present invention, with regard to the polarity of the AC power source Vac, the polarity during the half cycle in which the L-side terminal voltage among both ends L and N of the AC power source Vac becomes higher than the N-side terminal voltage is referred to as a positive polarity, and the polarity during the half cycle in which the N-side terminal voltage becomes higher than the L-side terminal voltage is referred to as a negative polarity. The power source apparatus 10 includes an AC polarity detection circuit (one example of an AC polarity detection unit) 4 for distinguishing between the positive and negative polarity of the AC power source Vac. An AC voltage of the AC power source Vac is input into the AC polarity detection circuit 4, and AC polarity signals (one example of an AC polarity detection signal) Vi1 and Vi2 indicating the polarity of the AC power source Vac are input into the drive control circuit 3.

The power factor correction circuit 1 of the power source apparatus 10 constituted as described above functions as a power factor correction circuit in which a bridgeless rectification circuit and a boosting circuit that share the first and second switching elements Q1 and Q2 are integrated by switching the first and second switching elements Q1 and Q2 in accordance with switching element drive signals S1 and S2 output from the drive control circuit 3.

Figure 3:
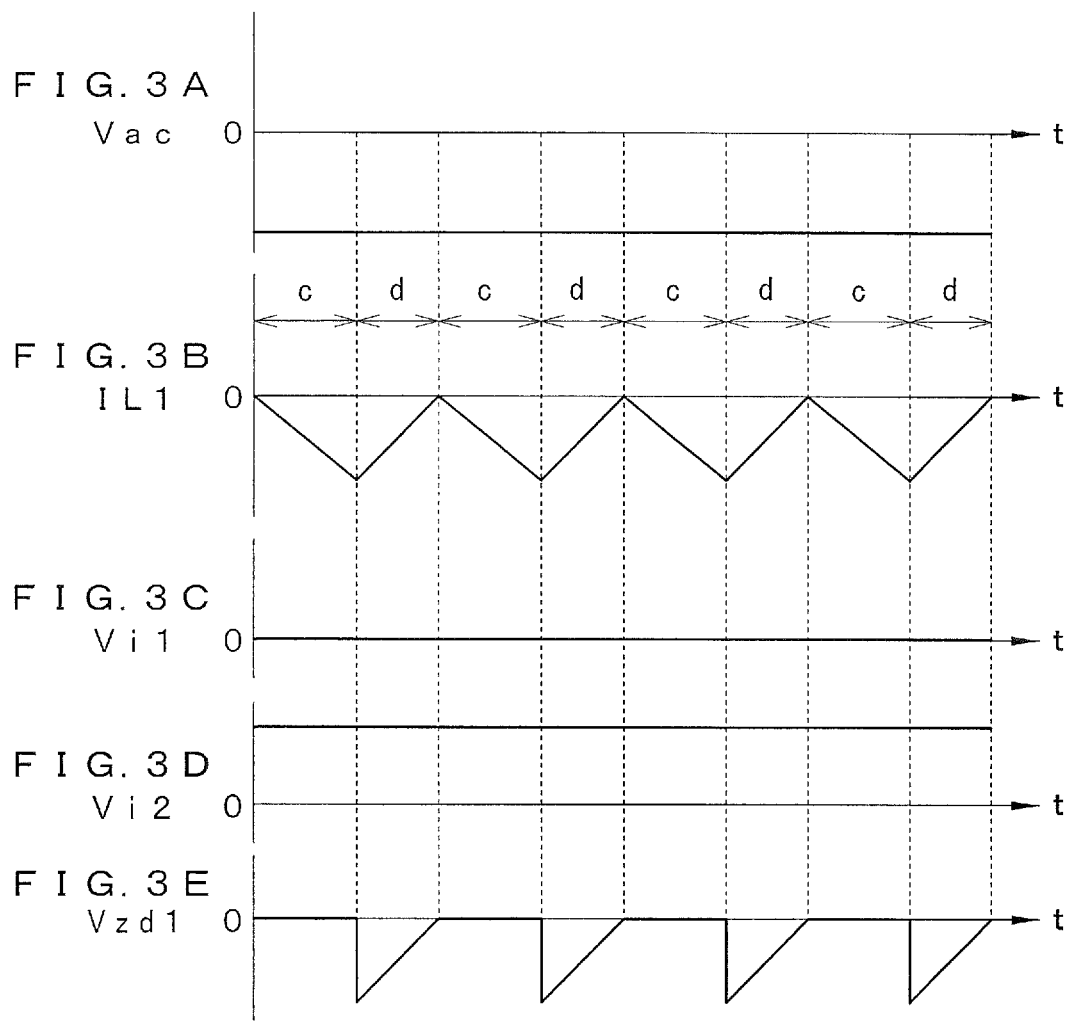
FIG. 3A to FIG. 3E are waveform diagrams each showing an enlargement of portion A in FIG. 2.

Referring to FIG. 1 to FIG. 3, the operation in a first control method of the power source apparatus 10 will be explained. In the first control method, the switching operations of the first switching element Q1 and the second switching element Q2 are carried out synchronously throughout the entire cycle of the AC power source Vac as will be explained below. Therefore, it is not necessary to distinguish between the positive and negative polarity of the AC power source Vac in the drive control circuit 3 in order to carry out at least the above switching operations. Accordingly, when operating the power source apparatus 10 with the first control method, the AC polarity detection circuit 4 can be eliminated from the circuit constitution shown in FIG. 1.

Among the waveforms shown in FIG. 2, FIG. 2A is a waveform showing a voltage between both ends of the AC power source Vac using the neutral point thereof as a reference, FIG. 2B is a reactor current IL1 that flows through the reactor L1, FIG. 2C is the AC polarity signal Vi1, FIG. 2D is the AC polarity signal Vi2, and FIG. 2E is the first zero current detection voltage Vzd1 to be explained below.

Further, FIG. 3 is a diagram showing an enlargement of portion A in FIG. 2.

The symbols "+" and "−" in FIG. 2A respectively indicate the half cycle in which the polarity of the AC power source Vac is positive (the positive half cycle) and the half cycle in which the polarity of the AC power source Vac is negative (the negative half cycle). Further, in FIG. 2B, the direction in which the reactor current IL1 flows from one end on the side of the connecting point of the first rectifier element D1 and the first switching element Q1 to one end on the side of the connecting point of the second rectifier element D2 and the second switching elements Q2 is represented as the positive direction. In FIGS. 2C, 2D, and 2E, the positive/negative of each voltage is indicated based on the ground potential. The waveform of FIG. 2E is illustrated as regions that are entirely filled in for the sake of explanation. Therefore, the top and the bottom of the filled regions of this waveform respectively represent a maximum envelope and a minimum envelope for one cycle of the ON/OFF operation of the first and second switching elements Q1 and Q2. In the reactor current IL1 in FIG. 2B, an oscillatory waveform of the reactor current IL1 in a critical mode is schematically illustrated in addition to the envelopes.

In the example shown in FIG. 2, a first AC polarity signal Vi1 that is input from the AC polarity detection circuit 4 into the drive control circuit 3 corresponds to a waveform in which the voltage between both ends of the AC power source Vac is half-wave rectified, and the second AC polarity signal Vi2 corresponds to a waveform in which the voltage between both ends of the AC power source Vac whose polarity has been inverted is half-wave rectified. The drive control circuit 3 has a distinguishing unit (not illustrated) that distinguishes between the positive and negative polarity of the AC power source Vac based on the AC polarity signals Vi1 and Vi2.

However, in the present invention, the AC polarity detection circuit 4 and the AC polarity signals Vi1 and Vi2 can be any appropriate circuit and signal as long as the positive and negative polarity of the AC power source Vac is determinable in the drive control circuit 3, and the drive control circuit 3 has an appropriate distinguishing unit in accordance with the signals. For example, the AC polarity signals can be a signal of one output that becomes high level or low level in accordance with the positive polarity and the negative polarity of the AC power source Vac.

The power source apparatus 10 distinguishes between the positive and negative polarity of the AC power source Vac by the AC polarity detection circuit 4 and detects the reactor current IL1 by the current detection unit R1. Thereby, the operation in the critical mode is realized as follows.

First, in the negative half cycle of the AC power source Vac, when the gate drive voltages S1 and S2 of the first and second switching elements Q1 and Q2 become high level and the switching elements are turned ON, a current path is formed in which an input current flows from the N-side terminal of the AC power source Vac, between the source and drain of the second switching element Q2, through the reactor L1, between the source and drain of the first switching element Q1, and finally to the L-side terminal of the AC power source Vac. The reactor current IL1 in the negative direction flowing to the reactor L1 gradually increases, and energy corresponding to the current value is stored in the reactor L1. This period corresponds to the period indicated by the symbol "c" in FIG. 3B, and hereinafter this period will also be referred to as the reactor L1 charge period (or simply the charge period).

Next, when the first and second switching elements Q1 and Q2 are turned OFF, a current path is formed in which an input current flows from the N-side terminal of the AC power source Vac, through a parasitic diode of the second switching element Q2, the reactor L1, the first rectifier element D1, and then charges the smoothing capacitor C1. The energy stored in the reactor L1 while the first and second switching elements Q1 and Q1 were ON is transported to the smoothing capacitor C1. During this time, the reactor current IL1 gradually decreases with the value directly before the first and second switching elements Q1 and Q2 are turned OFF as a peak value. This period corresponds to the period indicated by the symbol "d" in FIG. 3B, and hereinafter this period will also be referred to as the reactor L1 discharge period (or simply the discharge period). In the power source apparatus 10, a return path of the current path to the L-side terminal of the AC power source Vac is provided through the third rectifier element D3.

Next, in the positive half cycle of the AC power source Vac, when the gate drive voltages S1 and S2 of the first and second switching elements Q1 and Q2 become high level and the switching elements are turned ON, a current path is formed in which an input current flows from the L-side terminal of the AC power source Vac, between the source and drain of the first switching element Q1, through the reactor L1, between the source and drain of the second switching element Q2, and finally to the N-side terminal of the AC power source Vac. The reactor current IL1 in the positive direction flowing to the reactor L1 gradually increases, and energy corresponding to the current value is stored in the reactor L1 (hereinafter, similar to the negative half cycle, this period will also be referred to as the reactor L1 charge period or simply the charge period).

Next, when the first and second switching elements Q1 and Q2 are turned OFF, a current path is formed in which an input current flows from the L-side terminal of the AC power source Vac, through a parasitic diode of the first switching element Q1, the reactor L1, the second rectifier element D2, and then charges the smoothing capacitor C1. The energy stored in the reactor L1 while the first and second switching elements Q1 and Q1 were ON is transported to the smoothing capacitor C1. During this time, the reactor current IL1 gradually decreases with the value directly before the first and second switching elements Q1 and Q2 are turned OFF as a peak value (hereinafter, similar to the negative half cycle, this period will also be referred to as the reactor L1 discharge period or simply the discharge period). In the power source apparatus 10, a return path of the current path to the N-side terminal of the AC power source Vac is provided through the fourth rectifier element D4.

Therein, in the discharge period of the positive and negative half cycles, a return current that flows from one end on the ground-side of the smoothing capacitor C1 through the first resistor element R1, to the connecting point of the anode terminals of the third and fourth rectifier elements D3 and D4 is a first current detected in the current detection unit R1.

The current detection unit R1 is constituted such that one end of the first resistor element R1 on the side that is connected to the third rectifier element D3 is an output terminal, and a voltage of the output terminal is output to the drive control circuit 3 as the first zero current detection signal Vzd1. As shown in FIG. 3E, in the charge period of the reactor L1, the first current does not flow and thus the first zero current detection signal Vzd1 becomes the ground potential, whereas in the discharge period of the reactor L1, the first zero current detection signal Vzd1 becomes a negative voltage corresponding to the first current, and the absolute value of this negative voltage decreases together with a decrease in the first current.

The drive control circuit 3 includes a zero current detection unit (not illustrated) that detects a point in time at which the first zero current detection signal Vzd1 becomes zero (and thus the point in time at which the corresponding first current becomes zero). Thereby, the point in time at which the first current, and by extension the reactor current ILL becomes zero is detected (hereinafter this detection will also be simply referred to as zero current detection).

The drive control circuit 3 is constituted so as to turn ON the first and second switching elements Q1 and Q2 immediately after the above-described zero current detection and then turn OFF the first and second switching elements Q1 and Q2 again after a predetermined charge period has elapsed. In the positive and negative half cycles of the AC power source Vac, by repeating this kind of ON/OFF operation of the first and second switching elements Q1 and Q2, the power factor correction circuit 1 is operated in a critical mode and a desired DC voltage is fed to the load circuit 2.

In the power source apparatus 10, the drive control circuit 3 is constituted so as to output respectively input terminal voltages Vi3 and Vi4 of the AC power source Vac upon superimposing them on a predetermined gate-source voltages based on the specifications of the first and second switching elements Q1 and Q2 as the gate drive voltages S1 and S2 of the first and second switching elements Q1 and Q2.

This is because in the power source apparatus 10, in, for example, the positive half cycle of the AC power source Vac, the N-side terminal of the AC power source Vac is grounded to an output ground of the power factor correction circuit 1 via the fourth rectifier element D4, and the N-side terminal voltage Vi4 of the AC power source Vac that is input into the drive control circuit 3 is held at the ground potential and the high voltage L-side terminal voltage Vi3 becomes a voltage between both ends of the AC power source Vac with the output ground of the power factor correction circuit 1 as a reference.

In this case, by outputting the respectively input terminal voltages Vi3 and Vi4 of the AC power source Vac upon superimposing them on a predetermined gate-source voltage based on the specifications of the first and second switching elements Q1 and Q2, the gate drive voltage S1 in which the voltage between both ends of the AC power source Vac has been superimposed as a positive voltage on the predetermined gate-source voltage is output to the first switching element Q1 in which the source terminal is connected to the terminal L on the high voltage side of the AC power source Vac, and the predetermined gate-source voltage is output as is as the gate drive voltage S2 to the second switching element Q2 in which the source terminal is connected to the terminal N on the low voltage side of the AC power source Vac. Thereby, in the power source apparatus 10, the gate drive voltages S1 and S2 which are at the appropriate levels for the switching operations are fed to both the first and second switching elements Q1 and Q2.

Similarly, in the negative half cycle in which the N-side terminal of the AC power source Vac is grounded to the output ground of the power factor correction circuit 1 via the fourth rectifier element D4, by outputting the respectively input terminal voltages Vi3 and Vi4 of the AC power source Vac upon superimposing them on a predetermined gate-source voltage based on the specifications of the first and second switching elements Q1 and Q2, the gate drive voltages S1 and S2 which are at the appropriate levels for the switching operations are fed to both the second switching element Q2 in which the source terminal is connected to the terminal N on the high voltage side of the AC power source Vac and the first switching element Q1 in which the source terminal is connected to the terminal L on the low voltage side of the AC power source Vac.

In the power source apparatus 10 constituted as described above, since the AC power source Vac does not float from the ground of the output voltage of the power factor correction circuit 1, the EMI noise can be further reduced compared to a conventional power source apparatus.

In addition, in the power factor correction circuit 1 which is a bridgeless power factor correction circuit of the power source apparatus 10, the zero current detection can be carried out with an inexpensive and simple circuit constitution using the current detection unit R1 constituted by the first resistor element R1, and thus drive control in the critical mode can be realized.

In the operation of the power source apparatus 10 described above, in both the positive and negative half cycles of the AC power source Vac, the ON/OFF operations of the first and second switching elements Q1 and Q2 are synchronous. However, in the power source apparatus 10, the drive control circuit 3 can be constituted so as to control the first and second switching elements Q1 and Q2 such that the switching element among the first and second switching elements Q1 and Q2 that is connected to the high voltage-side terminal of the AC power source Vac is sustained in the ON state and the other switching element is switched (hereinafter this control method will also be referred to as a second control method).

In more detail, the drive control circuit 3 distinguishes in the distinguishing unit the polarity of the AC power source Vac by the first and second AC polarity signals Vi1 and Vi2 that are input from the AC polarity detection circuit 4. Based on the distinguishing result, in the positive half cycle of the AC power source Vac, the first switching element Q1 is permanently held in the ON state by outputting the gate drive voltage S1 in which the voltage between both ends of the AC power source Vac has been superimposed as a positive voltage on the predetermined gate-source voltage to the first switching element Q1 that is connected to the terminal L on the high voltage side of the AC power source Vac, whereas the second switching element Q2 is switched in the same way as in the first control method by outputting the predetermined gate drive voltage S2 to the second switching element Q2.

Thereby, even in the discharge period in which the second switching element Q2 is turned OFF, a current path is formed that flows between the source and drain of the first switching element Q1 instead of through the parasitic diode of the first switching element Q1.

Similarly, in the drive control circuit 3, based on the distinguishing result of the polarity of the AC power source Vac in the distinguishing unit as described above, in the negative half cycle of the AC power source Vac, the second switching element Q2 is permanently held in the ON state by outputting the gate drive voltage S2 in which the voltage between both ends of the AC power source Vac has been superimposed as a positive voltage on the predetermined gate-source voltage to the second switching element Q2 that is connected to the terminal N on the high voltage side of the AC power source Vac, whereas the first switching element Q1 is switched in the same way as in the first control method by outputting the predetermined gate drive voltage S1 to the first switching element Q1.

Thereby, even in the discharge period in which the first switching element Q1 is turned OFF, a current path is formed that flows between the source and drain of the second switching element Q2 instead of through the parasitic diode of the second switching element Q2.

In other words, according to the second control method, since a current does not flow to the parasitic diodes of the first and second switching elements Q1 and Q2, power loss can be reduced and the efficiency can be improved, and increases in the temperature of the first and second switching elements Q1 and Q2 can be prevented.

The drive control circuit 3 of the power source apparatus 10 is preferably constituted by a microcomputer system. Signal processing by the above-described zero current detection unit and by the distinguishing unit, if a distinguishing unit that carries out signal processing exists in the system, is carried out by digital calculation. However, the drive control circuit 3 can also carry out part or all of the signal processing by an analog circuit.

Next, further embodiments of the present invention will be explained referring to FIGS. 4 to 7. Here, what have been explained hereinabove are omitted. Only new topics will be the focus of the explanations.

Figure 4:
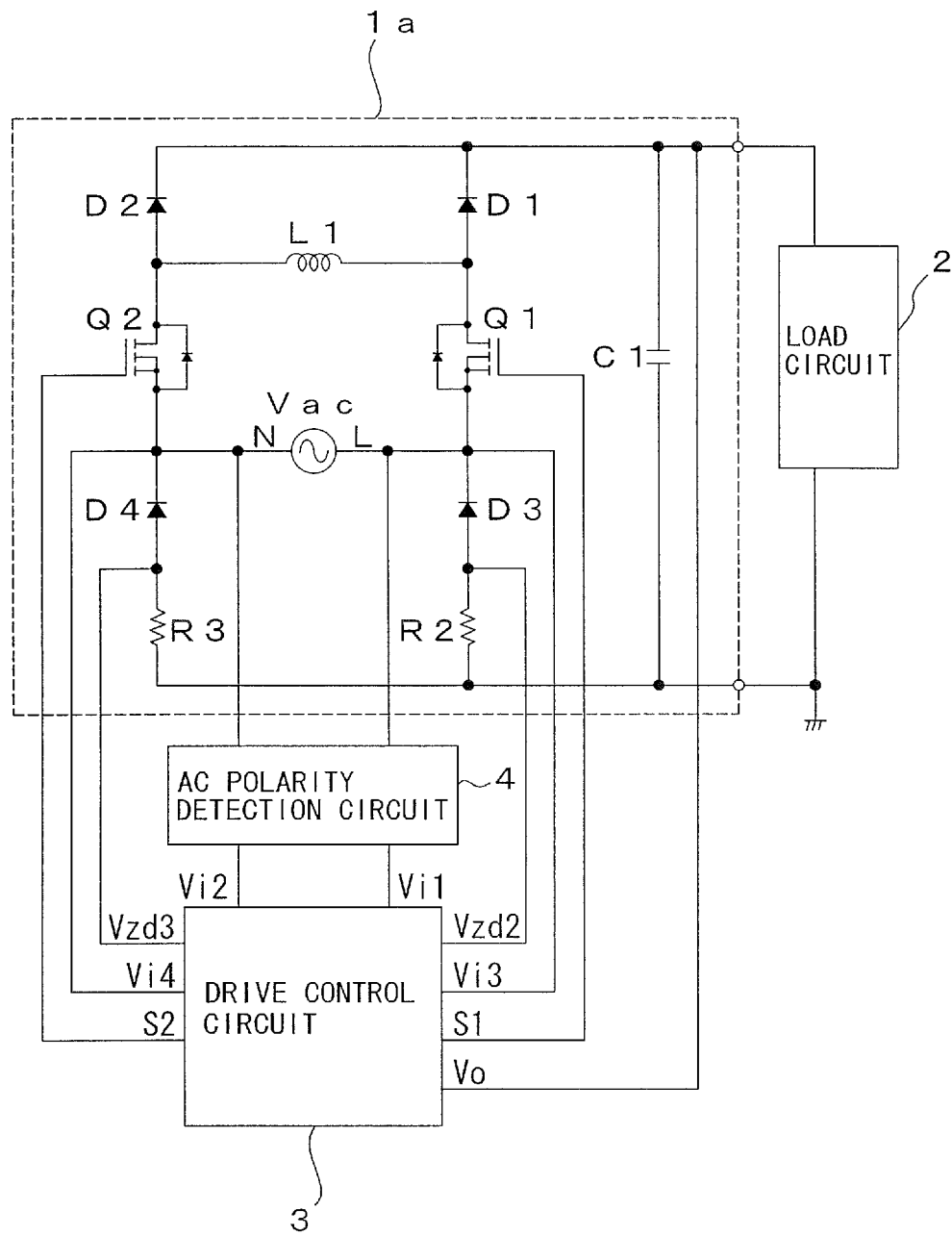
FIG. 4 is a circuit constitution diagram illustrating a power source apparatus according to a second embodiment of the present invention.
Figure 5:
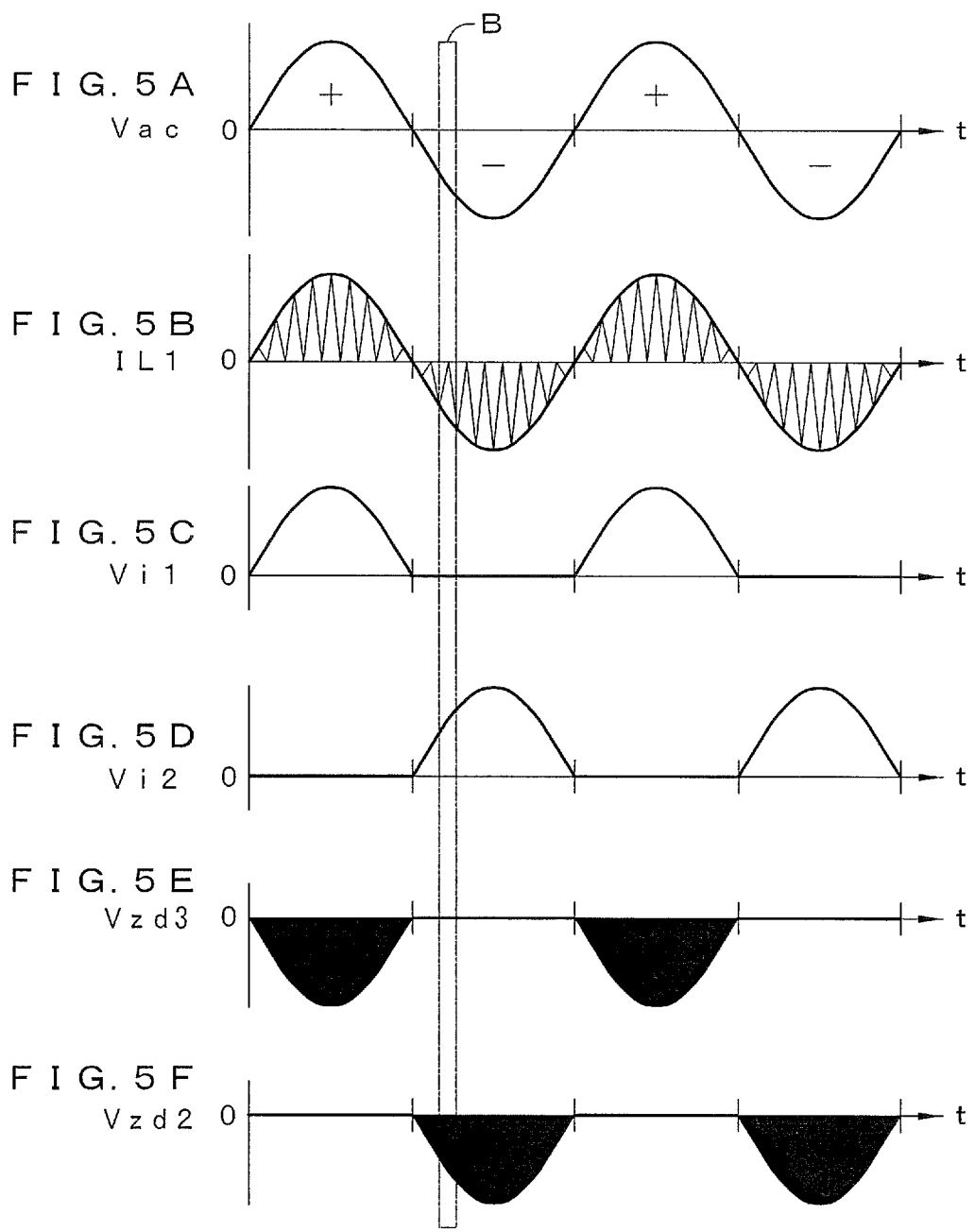
FIG. 5A to FIG. 5F are waveform diagrams each illustrating the operation of the essential parts of the power source apparatus shown in FIG. 4.
Figure 6:
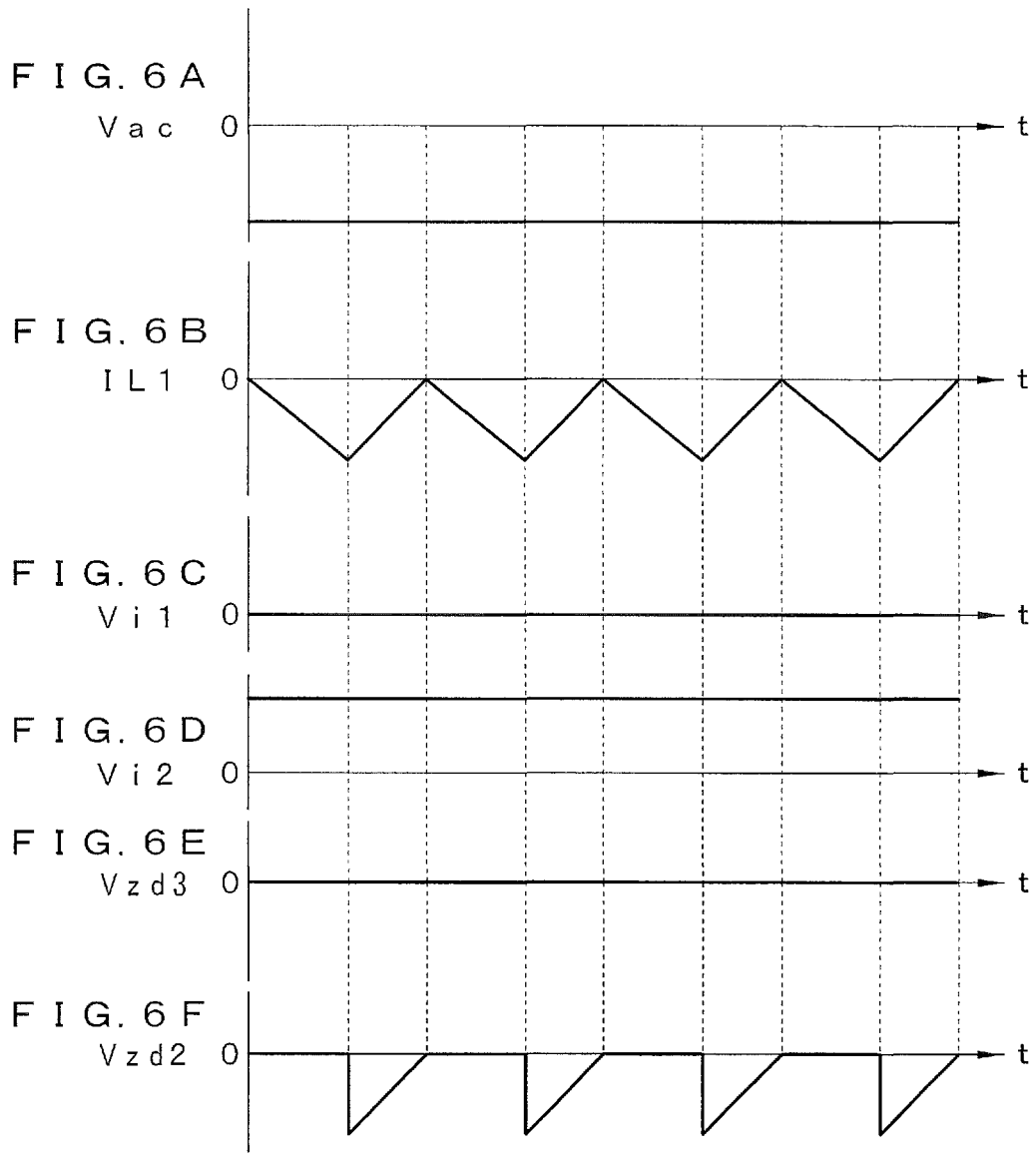
FIG. 6A to FIG. 6F are waveform diagrams each showing an enlargement of portion B in FIG. 5.

FIG. 4 is a circuit constitution diagram illustrating a power source apparatus 20 in a second embodiment of the present invention. FIG. 5 is a waveform diagram illustrating the operation of the essential parts of the power source apparatus 20. FIG. 6 is a waveform diagram showing an enlargement of portion B in FIG. 5.

The power source apparatus 20 differs from the power source apparatus 10 shown in FIG. 1 in the following regards. The power source apparatus 20 has a second resistor element R2, one end of which is connected to the anode terminal of the third rectifier element D3 and the other end of which is connected to one end on the ground side of the smoothing capacitor C1, and a third resistor element R3, one end of which is connected to the anode terminal of the fourth rectifier element D4 and the other end of which is connected to one end on the ground side of the smoothing capacitor C1. The first series circuit D1-Q1-D3 and the second series circuit D2-Q2-D4 are connected to each other in parallel by connecting the cathode terminals of the first and second rectifier elements D1 and D2 to each other and connecting the ends of the second resistor element R2 and the third resistor element R3 that are connected to the one end on the ground side of the smoothing capacitor C1 to each other.

In this way, in the power source apparatus 20, the current detection unit (hereinafter indicated by reference numeral R2-R3) is constituted by the second resistor element R2 disposed between the anode terminal of the third rectifier element D3 and the ground and the third resistor element R3 disposed between the anode terminal of the fourth rectifier element D4 and the ground.

In the negative half cycle of the AC power source Vac, a return path of the current path in the discharge period of the reactor L1 to the L-side terminal of the AC power source Vac is provided through the second resistor element R2 and the third rectifier element D3. Therein, a return current that flows from the one end on the ground side of the smoothing capacitor C1 through the second resistor element R2 and the third rectifier element D3 is a second current that is detected in the current detection unit R2-R3.

Similarly, in the positive half cycle of the AC power source Vac, a return path of the current path in the discharge period of the reactor L1 to the N-side terminal of the AC power source Vac is provided through the third resistor element R3 and the fourth rectifier element D4. Therein, a return current that flows from the one end on the ground side of the smoothing capacitor C1 through the third resistor element R3 and the fourth rectifier element D4 is a third current that is detected in the current detection unit R2-R3.

The current detection unit R2-R3 is constituted so that the one end of the second resistor element R2 on the side connected to the third rectifier element D3 and the one end of the third resistor element R3 on the side connected to the fourth rectifier element D4 are output terminals. The voltages of these output terminals are respectively output to the drive control circuit 3 as a second zero current detection signal Vzd2 and a third zero current detection signal Vzd3.

Since the second current does not flow in the positive half cycle of the AC power source Vac (refer to FIG. 5F) and in the charge period of the reactor L1 in the negative half cycle of the AC power source Vac (refer to FIG. 6F), the second zero current detection signal Vzd2 becomes the ground potential, whereas in the discharge period of the first reactor L1 in the negative half cycle of the AC power source Vac, the second zero current detection signal Vzd2 becomes a negative voltage corresponding to the second current, and the absolute value of this negative voltage decreases together with a decrease in the second current.

Since the third current does not flow in the negative half cycle of the AC power source Vac (refer to FIG. 5E) and in the charge period of the reactor L1 in the positive half cycle of the AC power source Vac (not illustrated), the third zero current detection signal Vzd3 becomes the ground potential, whereas in the discharge period of the first reactor L1 in the positive half cycle of the AC power source Vac, the third zero current detection signal Vzd3 becomes a negative voltage corresponding to the third current, and the absolute value of this negative voltage decreases together with a decrease in the third current.

The power source apparatus 20 also differs from the power source apparatus 10 in that the drive control circuit 3 includes a zero current detection unit (not illustrated) that detects the points in time at which the second and third zero current detection signals Vzd2 and Vzd3 become zero (and thus the points in time at which the corresponding second and third currents become zero) as follows. In the power source apparatus 20, the drive control circuit 3 distinguishes in the distinguishing unit the polarity of the AC power source Vac by the first and second AC polarity signals Vi2 and Vi3 that are input from the AC polarity detection circuit 4. Based on the distinguishing result, in the negative half cycle of the AC power source Vac, the point in time at which the second current becomes zero is detected using the second zero current detection signal Vzd2, and in the positive half cycle of the AC power source Vac, the point in time at which the third current becomes zero is detected using the third zero current detection signal Vzd3. Thereby, the zero current detection of the reactor current IL1 is carried out.

In the power source apparatus 20, as described above, the current detection unit R2-R3 is used, and the drive control circuit 3 alternately detects the second zero current detection signal Vzd2 and the third zero current detection signal Vzd3 output from the current detection unit R2-R3 in accordance with the positive half cycle and the negative half cycle of the AC power source Vac, and thereby a power factor correction circuit 1a is operated in a critical mode and a desired DC voltage is fed to the load circuit 2. The power source apparatus 20 thereby achieves the same effect as that of the power source apparatus 10. Needless to say, both the first control method and the second control method as described above can also be applied in the power source apparatus 20 as the method for controlling the switching operations of the first and second switching elements Q1 and Q2.

Next, a power source apparatus 30 according to a third embodiment of the present invention will be explained referring to FIG. 7. FIG. 7 is a circuit constitution diagram illustrating the power source apparatus 30.

The power source apparatus 30 differs from the power source apparatus 10 shown in FIG. 1 in that it includes a power factor correction circuit 1b in which a third rectifier element Q3 which is a constituent element of the first series circuit is constituted not by a diode but by a MOS-FET similar to the first and second switching elements Q1 and Q2, and a fourth rectifier element Q4 which is a constituent element of the second series circuit is constituted not by a diode but by a MOS-FET similar to the first and second switching elements Q1 and Q2.

In detail, in the power source apparatus 30, the source terminal of the first switching element Q1 of the first series circuit D1-Q1-Q3 is connected to the drain terminal of the third rectifier element Q3, and the source terminal of the second switching element Q2 of the second series circuit D2-Q2-Q4 is connected to the drain terminal of the fourth rectifier element Q4. The first series circuit D1-Q1-Q3 and the second series circuit D2-Q2-Q4 are connected to each other in parallel by connecting the cathode terminals of the first and second rectifier elements D1 and D2 to each other and connecting the source terminals of the third and fourth rectifier elements Q3 and Q4 to each other.

In the power source apparatus 30, the drive control circuit 3 is constituted so as to output gate drive voltages S3 and S4 which cause the third and fourth rectifier elements Q3 and Q4 to perform a switching operation, and by this switching operation, the rectifying operation of the third and fourth rectifier elements Q3 and Q4 is controlled by so-called synchronous rectification (the details of the above-mentioned switching operation will be explained below). In the present invention, the terms "third rectifier element" and "fourth rectifier element" include a case in which a switching element such as a MOS-FET is used for carrying out synchronous rectification by its switching operation as described above.

Next, the operation in a third control method of the power source apparatus 30 will be explained. The third control method is the same as the first control method described above with regard to the switching operations of the first and second switching elements Q1 and Q2.

In the third control method, the drive control circuit 3 controls the third and fourth rectifier elements Q3 and Q4 so that the rectifier element among the third and fourth rectifier elements Q3 and Q4 that is connected to the terminal on the high voltage side of the AC power source Vac is sustained in the OFF state, and the other rectifier element performs a switching operation.

Specifically, in the positive half cycle of the AC power source Vac, the gate drive voltage S3 for the third rectifier element Q3 connected to the terminal L on the high voltage side of the AC power source Vac is held at a low level, and the third rectifier element Q3 is maintained in the OFF state. Meanwhile, the gate drive voltage S4 which is a pulse voltage that is complementary to the gate drive voltages S1 and S2 for the first and second switching elements Q1 and Q2 is output from the drive control circuit 3 to the fourth rectifier element Q4, and thereby the fourth rectifier element Q4 executes a switching operation that is complementary to the switching operations of the first and second switching elements Q1 and Q2.

Therefore, while the gate drive voltages S1 and S2 of the first and second switching elements Q1 and Q2 are at a high level and the switching elements are turned ON (the third and fourth rectifier elements Q3 and Q4 are turned OFF), a current path is formed in which an input current flows from the L-side terminal of the AC power source Vac, between the source and drain of the first switching element Q1, through the reactor L1, between the source and drain of the second switching element Q2, and finally to the N-side terminal of the AC power source Vac. The reactor current IL1 in the positive direction flowing to the reactor L1 gradually increases, and energy corresponding to the current value is stored in the reactor L1 (charge period of the reactor L1).

Next, when the first and second switching elements Q1 and Q2 are turned OFF and the fourth rectifier element Q4 is turned ON, a current path is formed in which an input current flows from the L-side terminal of the AC power source Vac, thorough a parasitic diode of the first switching element Q1, the reactor L1, and the second rectifier element D2, and then charges the smoothing capacitor C1. The energy stored in the reactor L1 while the first and second switching elements Q1 and Q1 were ON is transported to the smoothing capacitor C1. During this time, the reactor current IL1 gradually decreases with the value directly before the first and second switching elements Q1 and Q2 are turned OFF as a peak value (discharge period of the reactor L1). In the power source apparatus 30, a return path of the current path to the N-side terminal of the AC power source Vac is provided through the source-drain of the fourth rectifier element Q4 that is turned ON.

Further, in the negative half cycle of the AC power source Vac, the gate drive voltage S4 for the fourth rectifier element Q4 connected to the terminal N on the high voltage side of the AC power source Vac is held at a low level, and the fourth rectifier element Q4 is maintained in the OFF state. Meanwhile, the gate drive voltage S3 which is a pulse voltage that is complementary to the gate drive voltages S1 and S2 for the first and second switching elements Q1 and Q2 is output from the drive control circuit 3 to the third rectifier element Q3, and thereby the third rectifier element Q3 executes a switching operation that is complementary to the switching operations of the first and second switching elements Q1 and Q2.

Therefore, while the gate drive voltages S1 and S2 of the first and second switching elements Q1 and Q2 are at a high level and the switching elements are turned ON (the third and fourth rectifier elements Q3 and Q4 are turned OFF), a current path is formed in which an input current flows from the N-side terminal of the AC power source Vac, between the source and drain of the second switching element Q2, through the reactor L1, between the source and drain of the first switching element Q1, and finally to the L-side terminal of the AC power source Vac. The reactor current IL1 in the negative direction flowing to the reactor L1 gradually increases, and energy corresponding to the current value is stored in the reactor L1 (charge period of the reactor L1).

Next, when the first and second switching elements Q1 and Q2 are turned OFF and the third rectifier element Q3 is turned ON, a current path is formed in which an input current flows from the N-side terminal of the AC power source Vac, thorough a parasitic diode of the first switching element Q1, the reactor L1, and the first rectifier element D1, and then charges the smoothing capacitor C1. The energy stored in the reactor L1 while the first and second switching elements Q1 and Q1 were ON is transported to the smoothing capacitor C1. During this time, the reactor current IL1 gradually decreases with the value directly before the first and second switching elements Q1 and Q2 are turned OFF as a peak value (discharge period of the reactor L1). In the power source apparatus 30, a return path of the current path to the L-side terminal of the AC power source Vac is provided through the source-drain of the third rectifier element Q3 that is turned ON.

Therein, in the discharge period of the positive and negative half cycles, a return current that flows from one end on the ground-side of the smoothing capacitor C1 through a first resistor element R4, to the connecting point of the source terminals of the third and fourth rectifier elements Q3 and Q4 is a first current detected in a current detection unit R4. The drive control circuit 3 carries out zero current detection using a first zero current detection signal Vzd4 that is output in accordance with the first current from the current detection unit R4, and this is the same as in the power source apparatus 10 shown in FIG. 1.

As described above, when operating in accordance with the third control method of the power source apparatus 30, in addition to achieving the same operational effects as when operating in accordance with the first control method of the power source apparatus 10, the current flows between the source and drain of the third and fourth rectifier elements Q3 and Q4 constituted by switching elements instead of through the third and fourth rectifier elements D3 and D4 constituted by diodes in the above-described current paths formed in the discharge period. Therefore, power loss can be reduced and the efficiency can be improved.

Further, the power source apparatus 30 according to the present embodiment can also operate in accordance with a fourth control method. The fourth control method is the same as the second control method described above with regard to the switching operations of the first and second switching elements Q1 and Q2.

The fourth control method is the same as the third control method described above except with regard to the following points. In the fourth control method, in the half cycle in which the polarity of the AC power source Vac is positive, the first switching element Q1 among the first and second switching elements Q1 and Q2 is held in the ON state and only the second switching element Q2 executes a switching operation. In the half cycle in which the polarity of the AC power source Vac is negative, the second switching element Q2 among the first and second switching elements Q1 and Q2 is held in the ON state and only the first switching element Q1 executes a switching operation. Accordingly, in the half cycle in which the polarity of the AC power source Vac is positive, the fourth rectifier element Q4 executes a switching operation that is complementary to the switching operation of the second switching element Q2, and in the half cycle in which the polarity of the AC power source Vac is negative, the third rectifier element Q3 executes a switching operation that is complementary to the switching operation of the first switching element Q1.

When operating in accordance with the fourth control method of the power source apparatus 30, in addition to achieving the same operational effects as when operating in accordance with the third control method, the current does not flow to the parasitic diodes of the first and second switching elements Q1 and Q2 in the above-described current paths formed in the discharge period. Therefore, power loss can be reduced and the efficiency can be improved, and increases in the temperature of the first and second switching elements Q1 and Q2 can be prevented.

Preferred embodiments of the present invention have been described above. However, the power source apparatus according to the present invention is not limited to the above-described embodiments.

For example, in the above-described embodiments, the switching elements that function as the first and second switching elements Q1 and Q2 in the power source apparatuses 10, 20, and 30 and the third and fourth rectifier elements Q3 and Q4 in the power source apparatus 30 were constituted by MOS-FETs, but any appropriate switching element such as an IGBT can be used as these switching elements.

Further, the present invention includes a power source apparatus including a power factor correction circuit in which the third and fourth rectifier elements D3 and D4 which are constituted by diodes in the constitution of the power source apparatus 20 shown in FIG. 4 are replaced with the third and fourth rectifier elements Q3 and Q4 which are constituted by switching elements such as MOS-FETs and execute a synchronous rectification operation similar to the power source apparatus 30 shown in FIG. 7.

What is claimed is:
1. A power source apparatus comprising:
a power factor correction circuit comprising:

a first series circuit that consists of a first rectifier element, a first switching element, and a third rectifier element, a second series circuit that consists of a second rectifier element, a second switching element, and a fourth rectifier element, and is connected in parallel to the first series circuit, a smoothing capacitor that is connected in parallel to the first and second series circuits and a load circuit, and a reactor, one end of which is connected to a connecting point between the first rectifier element and the first switching element and the other end of which is connected to a connecting point between the second rectifier element and the second switching element; and a control circuit unit that inputs an alternating current voltage of an AC power source and an output voltage output to the load circuit, and controls a switching operation of at least the first and second switching elements;

wherein one end of the AC power source is connected to a connecting point between the first switching element and the third rectifier element and the other end of the AC power source is connected to a connecting point between the second switching element and the fourth rectifier element;

wherein the power source apparatus further comprises:

an AC polarity detection unit that detects a positive/negative polarity of the AC power source; and a current detection unit that detects a first current flowing between a connecting point of the third rectifier element and the fourth rectifier element and a ground, or detects a second current flowing to the third rectifier element and a third current flowing to the fourth rectifier element;

wherein the control circuit unit controls the first and second switching elements based on a first zero current detection signal output from the current detection unit in accordance with the first current or based on second and third zero current detection signals output from the current detection unit in accordance with the second and third currents, and feeds a desired direct current voltage to the load circuit.

2. The power source apparatus according to claim 1, wherein a positive half cycle and a negative half cycle of the AC power source are determined based on an AC polarity detection signal output from the AC polarity detection unit.

3. The power source apparatus according to claim 1, wherein the current detection unit comprises a first resistor element that is disposed between a connecting point of the third rectifier element and the fourth rectifier element and a ground, and detects the first current.

4. The power source apparatus according to claim 1, wherein the current detection unit comprises a second resistor element that is disposed between one end of the third rectifier element that is on the opposite side of an end connected to the first switching element and a ground and detects the second current, and a third resistor element that is disposed between one end of the fourth rectifier element that is on the opposite side of an end connected to the second switching element and a ground and detects the third current.

5. The power source apparatus according to claim 4, wherein the control circuit unit alternately detects the second zero current detection signal and the third zero current detection signal output from the current detection unit in accordance with the positive half cycle and the negative half cycle of the AC power source.

6. The power source apparatus according to claim 2, wherein the current detection unit comprises a first resistor element that is disposed between a connecting point of the third rectifier element and the fourth rectifier element and a ground, and detects the first current.

7. The power source apparatus according to claim 2, wherein the current detection unit comprises a second resistor element that is disposed between one end of the third rectifier element that is on the opposite side of an end connected to the first switching element and a ground and detects the second current, and a third resistor element that is disposed between one end of the fourth rectifier element that is on the opposite side of an end connected to the second switching element and a ground and detects the third current.

8. The power source apparatus according to claim 7, wherein the control circuit unit alternately detects the second zero current detection signal and the third zero current detection signal output from the current detection unit in accordance with the positive half cycle and the negative half cycle of the AC power source.

* * * * *